(12) United States Patent  (10) Patent No.: US 7,240,814 B2
Holmberg  (45) Date of Patent: Jul. 10, 2007

(54) VEHICLE CENTER CONSOLE DEFINING A RECONFIGURABLE STORAGE AREA

(75) Inventor: Michael Holmberg, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 520 days.

(21) Appl. No.: 10/809,611

(22) Filed: Mar. 25, 2004

(65) Prior Publication Data

US 2005/0211741 A1 Sep. 29, 2005

(51) Int. Cl.
*B60R 7/00* (2006.01)
*B60P 3/20* (2006.01)

(52) U.S. Cl. .............. 224/275; 220/529; 220/530; 296/24.34

(58) Field of Classification Search ........... 224/275, 224/539, 542, 402, 403, 405; 220/529, 530, 220/9.4; 296/24.34, 24.4, 37.8, 24.45; 206/140, 206/462, 464, 465, 467; 280/749
See application file for complete search history.

(56) References Cited

U.S. PATENT DOCUMENTS 2,024,884 A * 12/1935 Schlegel .................. 224/563
2,627,637 A 2/1953 Downing
4,434,900 A * 3/1984 Cook .................... 211/189
4,900,204 A 2/1990 Summers
5,328,310 A 7/1994 Lockney
5,340,004 A 8/1994 Moore
5,368,210 A * 11/1994 Wotring ................. 224/558
5,628,442 A 5/1997 Wayne
5,685,470 A 11/1997 Moore
5,893,597 A * 4/1999 Rider ..................... 296/37.6
6,247,741 B1 * 6/2001 Seel et al. .............. 296/37.3
6,550,654 B1 4/2003 Crago
6,616,389 B1 9/2003 Ament et al.
6,619,738 B1 9/2003 Filipovich
6,695,373 B1 * 2/2004 Meise ..................... 280/749
7,104,580 B2 * 9/2006 Clark et al. ............. 296/37.8
2002/0179663 A1 * 12/2002 Moore et al. ............ 224/539
2003/0000982 A1 * 1/2003 Gehring et al. .......... 224/539

* cited by examiner

*Primary Examiner*—Nathan J. Newhouse
*Assistant Examiner*—Meg Olson
(74) *Attorney, Agent, or Firm*—Rankin, Hill, Porter & Clark LLP

(57) ABSTRACT

A center console storage system for a vehicle includes an enclosure defining a storage space that is easily reconfigured using one or more webs. Each web includes a plurality of fasteners that are easily attached to, and detached from, a plurality of receptacles that are provided by the enclosure. As a result the web configuration may be easily changed to secure different sized items without compromising the usefulness of the remaining storage area.

10 Claims, 3 Drawing Sheets

VEHICLE CENTER CONSOLE DEFINING A RECONFIGURABLE STORAGE AREA

BACKGROUND OF THE INVENTION

1. Field of the Invention

The present invention applies to vehicle components and more specifically to center console storage components.

2. Description of Related Art

Storage space within modern vehicles is at a premium. One area within vehicles which has become more utilized is the center console, typically located between two front bucket seats. The size of the center console varies based on the size of the vehicle's passenger compartment. Thus, some center consoles are designed large enough to store a number of items. Existing center consoles typically define a single open space. Alternatively, an open space is combined with a smaller compartment for the storage of coins or other small items. Unfortunately, items placed within the open space have a tendency to move around and get jostled during operation of the vehicle.

An additional drawback to existing center consoles including a single open space or multiple spaces separated by static dividers is the loss of use of remaining space within the console. In the case of a single open space, because multiple items must be stacked, it becomes difficult to reach the lowest item. As a result, multiple items are not conveniently stored within the single open space. In the case of a static multi-space configuration, the static barrier is rigid and may be located at an undesirable position. It may have been possible to store another item within the area defined by the remainder of the open space and that of the smaller space, but for the static divider. If the static divider is removable, there is often no place for it to be stored. Therefore, incorporation of a removable divider does not alleviate the center console storage problem, but rather creates further problems and inconveniences for the user.

Therefore, there exists, among other things, a need in the art for an improved center console wherein objects stored within the center console are gently held in place to avoid shifting or rattling during travel. Moreover, there exists a need in the art for a center console wherein the storage space may be easily reconfigured to accommodate varying sized articles. Additionally, the means used to hold objects in place preferably would not detract from the utilization of the remainder of the storage space.

SUMMARY OF THE INVENTION

The present invention provides a center console assembly that defines storage space that is easily reconfigured. Moreover, the present invention provides a center console assembly wherein objects are gently held in place and wherein objects stored at a bottom of the console storage space are visible despite a separator being disposed there above.

In accordance with the present invention, the center console assembly includes an enclosure, which defines the storage space, and a flexible web. The web is able to hold objects in place so they do not shift during travel and enables full utilization of the storage space. The web is easily attached to and detached from the enclosure and can be attached to the enclosure in a number of different configurations. As a result, different sized items may be stored on or below the web, thereby without a loss of the remaining storage space.

The enclosure includes a front wall, a rear wall, first and second spaced side walls, a bottom wall and a lid. Each of the first and second side walls include a plurality of receptacles. Attachment of the web to the enclosure is achieved using a set of fasteners upon the web that fit into the receptacles upon the enclosure. The number of receptacles exceeds the number of fasteners and allows for different configurations of the web. The web may be in the form of a net.

These and other aspects of the invention are herein described in particularized detail with reference to the accompanying figures.

DETAILED DESCRIPTION OF THE PREFERRED EMBODIMENTS

Figure 2:
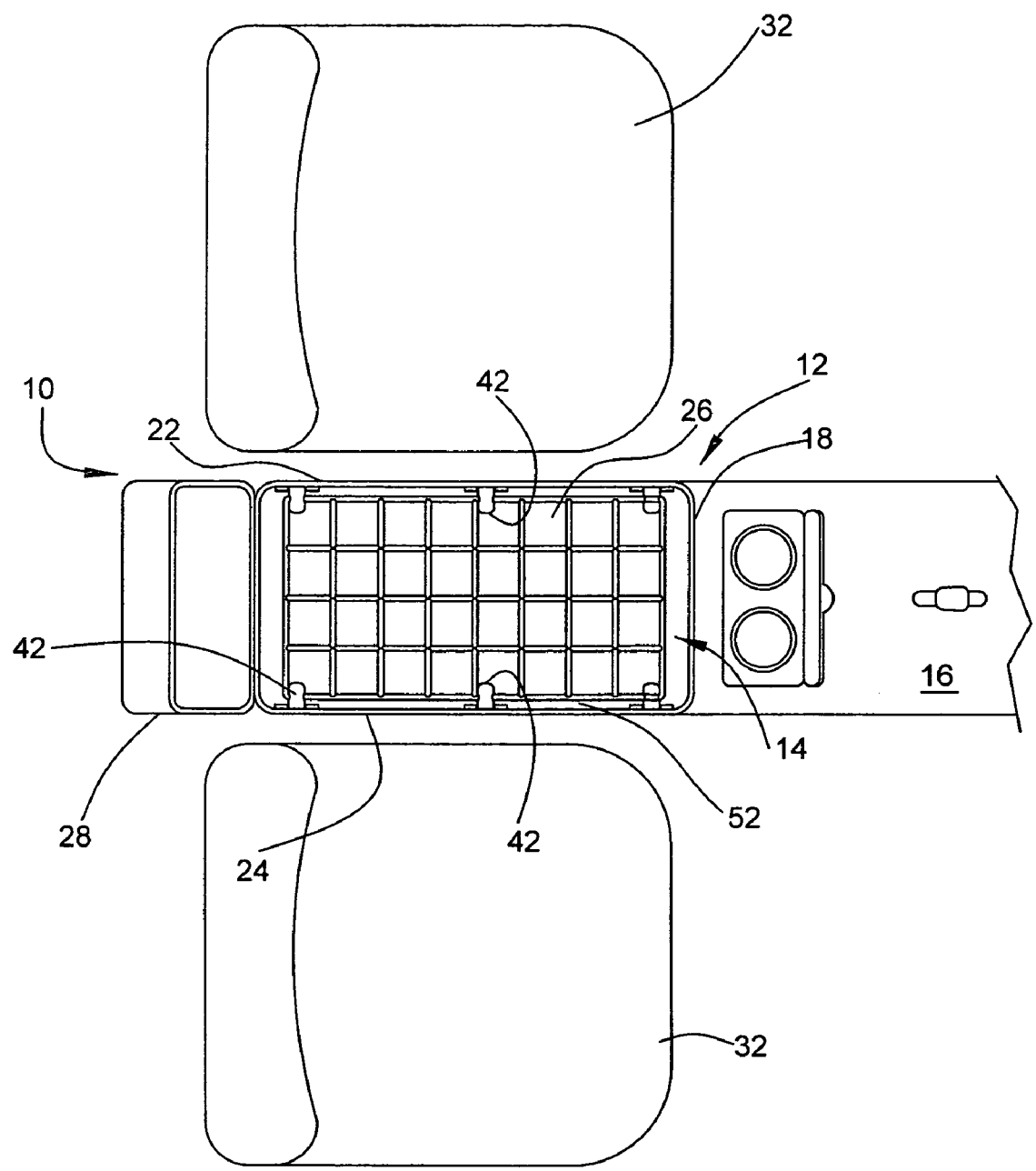
FIG. 2 is a plan view of a portion of a passenger compartment of a vehicle, showing the center console assembly with a lid in an open position.

Referring to the drawings, a center console assembly 10 according to the present invention is illustrated. The center console assembly 10 is used to secure items that vehicle occupants wish to access easily for storage in a preferred orientation. Such items include, but are not limited to, cell phones, personal digital assistants (PDA), a notebook computer, gloves, an ice scraper, MP3 player, beverage containers, a personal computer case, or takeout food. Referring to FIG. 2, the center console assembly 10 is preferably located between two bucket seats 32 of a vehicle 16. Alternatively, the center console assembly 10 may be located between seats in the rear of the vehicle 16. The center console assembly 10 includes an enclosure 12, which defines a storage area, and a web 14, which segregates or divides the storage area within the enclosure 12 into a plurality of storage spaces.

Figure 1:
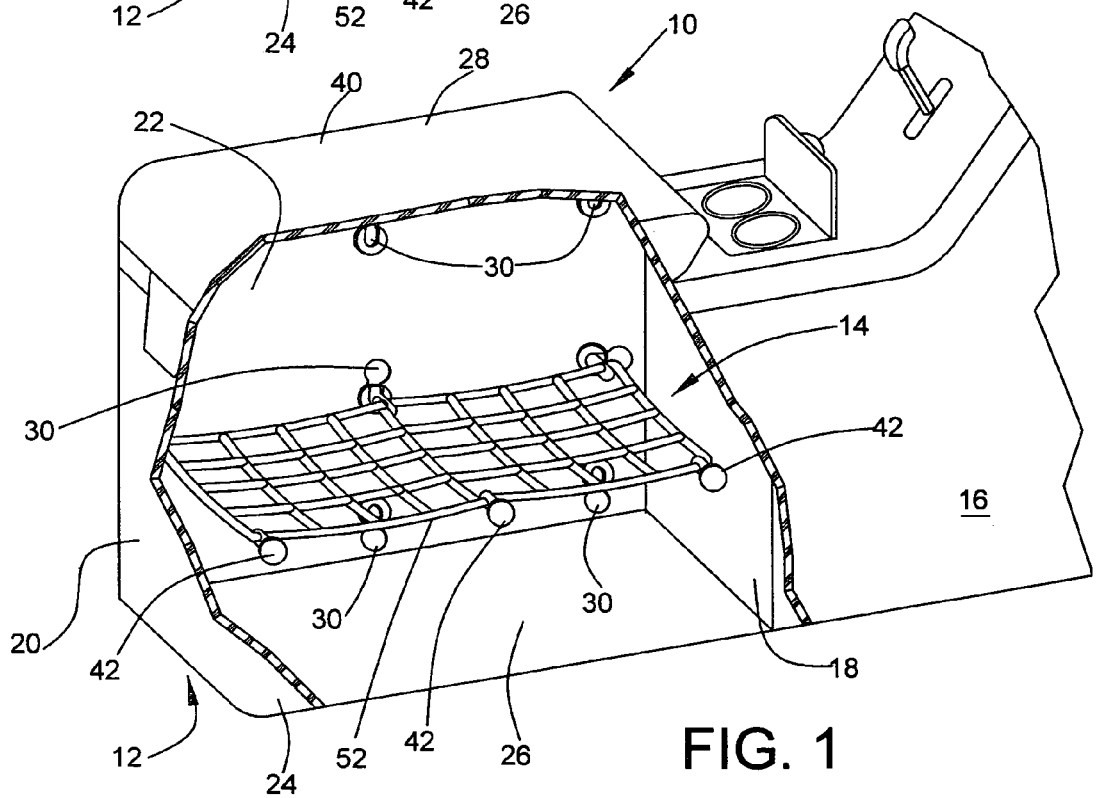
FIG. 1 is a perspective view of a center console assembly of the present invention showing a web in generally horizontal configuration.

Referring to FIG. 1, the enclosure 12 of the center console assembly 10 has a generally rectangular shape and includes a front wall 18, a rear wall 20, first and second spaced side walls 22 and 24, a base wall 26 and a lid 28. The side walls 22 and 24 define a plurality of receptacles or mounting openings 30 that are adapted to releasably secure the web 14 to the enclosure 12. The lid 28 is pivotally secured to the rear wall 20 and is movable between an open and closed position. Alternatively, the enclosure 12 may have a shape which is not rectangular, but instead another shape such as ovoid.

Referring to FIGS. 1 and 2, the size of the enclosure 12 is defined by the constraints of the vehicle 16. The width dimension of the enclosure 12 extends between the two adjacent seats 32 in the vehicle 16. The height dimensions of the enclosure 12 extends between the vehicle floor and the position where the vehicle occupant's elbow is located when the occupant is seated in the vehicle 16. The length dimension of the enclosure 12 extends between the vehicle's instrument panel and, conventionally, the rear surface of the front seats 32 of the vehicle 16.

The enclosure 12 defines the exterior of the center console assembly 10 as well as the storage area within. The enclosure 12 can be manufactured in a number of different ways. In one embodiment, the enclosure 12 has a laminate form and includes an exterior shell and a removable insert that fits within the shell. The shell could be formed from a material having a color and texture that is consistent with the remainder of the vehicle interior, while the removable insert could be made from a polymer, typically smooth, and is different from the material of the exterior shell. Alternatively, the enclosure 12 may be formed by an overmolding process where the insert structure is permanently molded inside of an exterior shell. Also, the enclosure 12 may not include an insert per se, but instead reinforcing members molded into the sides of the exterior shell. Further center console or enclosure structures are known within the art and may be used interchangeably with the present invention. In the following, the interior surface of the exterior shell defines the storage area of the enclosure 12.

The lid 28 acts as a support for the elbow for the vehicle's occupant, and may include a cushion 40 as its uppermost surface to provide comfort. The base wall 26 is integrally formed with the front wall 18, rear wall 20, and side walls 22 and 24, and provides a level surface at the bottom of the enclosure 12. The side walls 22 and 24 may include pockets (not shown) on their exterior surfaces to hold materials (maps, books, etc.).

Figure 3:
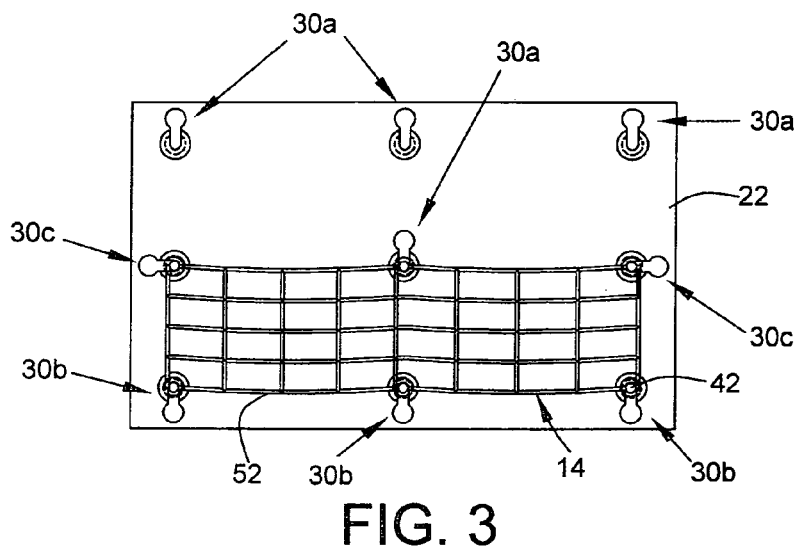
FIG. 3 is an elevational view of a side wall of the enclosure showing the web in a generally vertical configuration.

Referring to FIG. 3, receptacles 30 are preferably integrally formed in the interior surfaces of the side walls 22 and 24 of the enclosure 12. The receptacles 30 releaseably receive fasteners 42 provided by the web 14 so as to permit the web 14 to be easily affixed to, and detached from, the side wall 22 and 24. As described in more detail below, the receptacles 30 are arranged in a pattern or array in the side walls 22 and 24.

Figure 4A:
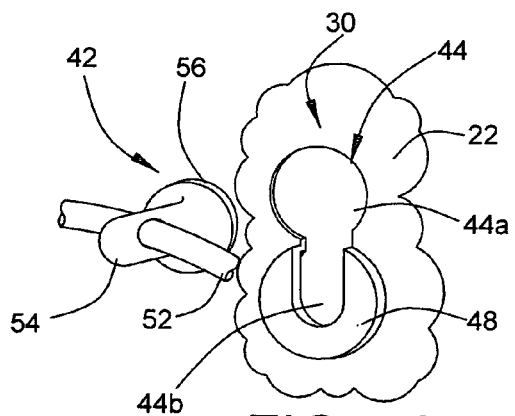
FIG. 4A is an exploded perspective view of a fastener and receptacle of the center console assembly.
Figure 4B:
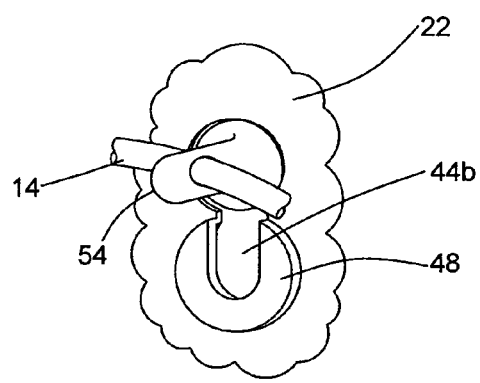
FIG. 4B is a perspective view of the fastener being inserted into the receptacle.
Figure 4C:
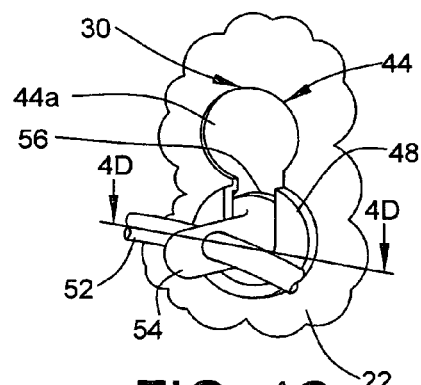
FIG. 4C is a perspective view of the fastener resting upon a seat within the receptacle.
Figure 4D:
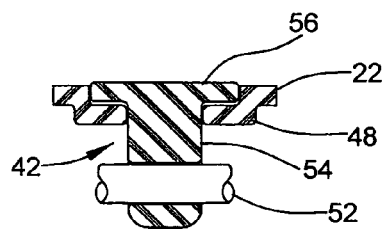
FIG. 4D is a cross sectional view of the fastener and receptacle as seen along line 4D—4D of FIG. 4C.

Referring to FIGS. 4A–C, each receptacle 30 includes a keyhole shaped passage 44 and a raised seat 48. The keyhole shaped passage 44 includes a generally circular aperture 44a and a slot 44b. The circular aperture 44a is adjacent the seat 48 and the slot 44b is formed in the seat 48 so that the keyhole shaped passage 44 is continuous. The seat 48 is generally circular in shape, and is raised or inset from the side wall 22 such that a generally circular space or gap is formed therebehind. The slot 44b, which is formed in the seat 48, permits a fastener received within the receptacle 30 (i.e. behind the seat 48) to extend through the seat 48 toward the interior storage area of the enclosure 12.

Although in the present embodiment the receptacles 30 are integrally formed with side walls 22 and 24, it is contemplated that the receptacles 30 may be formed in separate receptacle members and affixed to the side walls 22 and 24 using adhesive bonding techniques or mechanical fasteners. Alternatively, the receptacles 30 for each side wall 22, 24 may be provided by a separate plate that is affixed to the side wall 22, 24 using mechanical fasteners or adhesive bonding techniques. According to this alternative embodiment, a first plate including a plurality of receptacles 30 would be secured to the first side wall 22 while a second plate including a plurality of receptacles 30 would be secured to the second side wall 24. It is further contemplated that individual rows of receptacles could be provided by a separate plate strip that is attached to the associated side wall 22, 24 using mechanical fasteners or adhesive bonding techniques. According to this further embodiment, a plurality of plate strips, each including a plurality of receptacles 30, would be attached to each side wall 22, 24. In alternate embodiments of the invention receptacles 30 may additionally or alternatively be added to the front wall 18 or rear wall 20 of the enclosure. Such additional receptacles 30 may be integrally formed with the front or rear walls 18, 20, or may be provided as separate members, as part of separate plates, or as part of separate plate strips that are subsequently affixed to the front or rear walls, as noted hereinbefore.

Referring to FIG. 3, in order to provide a superior degree of variability in positioning the web or webs 14 within the storage area defined by the enclosure 12, the number of receptacles 30 within the enclosure 12 exceeds the number of fasteners 42 upon the web 14. The receptacles 30 are shown configured and oriented in a particular manner, although other configurations and orientations may be used. In the following, the receptacles 30 that are oriented with the generally circular aperture 44a at the uppermost portion of the receptacle are identified as "upwardly oriented receptacle 30a", the receptacles 30 that are oriented with the generally circular aperture 44a at the lowermost portion of the receptacle are identified as "downwardly oriented receptacle 30b", and the receptacles 30 oriented such that generally circular aperture 44a facing toward an adjacent edge of the sidewall 22, 24 are identified as "laterally oriented receptacle 30c".

In the illustrated embodiment of the invention, the receptacles 30 are configured in three rows of three receptacles 30 each upon each side wall 22 and 24 of the enclosure 12. Additionally, the orientation of the receptacles 30 upon each side wall 22 and 24 is not uniform. The lowermost row includes three downwardly oriented receptacles 30b; the uppermost row includes three upwardly oriented receptacles 30a; and the intermediate row includes a first laterally oriented receptacle 30c adjacent a first edge of a side wall 22 of the enclosure, a second laterally oriented receptacle 30c adjacent an opposite edge of the side wall 22 of the enclosure, and an upwardly oriented receptacle 30a intermediate the first and second laterally oriented receptacles 30c.

FIG. 2 shows a web 14 that serves to segregate the storage area within the enclosure 12. The web 14 includes a flexible member 52 and a series of fasteners 42. The flexible member 52 is a net that is generally rectangular in shape. The net has a suitable mesh sized so as to permit a user to see objects stored within the enclosure 12 beneath the net.

The fasteners 42 permit the flexible member 52 or net to be detachably affixed to the enclosure 12. Referring now to FIGS. 2 and 4A–4D a fastener 42 is shown as a toggle having a stem portion 54 and a head portion 56. The head portion 56, which is formed at a first end of the fastener 42, is generally circular and defines an axis. The stem portion 54, which is elongated and generally cylindrical, is integrally formed with the head portion 56. The stem portion 54 defines an axis that is coaxial with the head portion axis. The stem portion 54 defines a net-receiving aperture, which extends transverse to the stem portion axis at the second end of the fastener 42. A portion of the flexible member 52 of the web 14 extends through the aperture in the stem portion 54 as illustrated.

The diameter of the head portion 56 is selected such that the head portion 56 can be inserted into the circular aperture 44a at the first end of the receptacle 30 (FIG. 4B) and slidably received behind the receptacle seat 48 (FIG. 4C). The stem portion 54 is elongated and has a diameter such that the stem portion 54 is slidably received by, and extends through, the slot 44b formed in the receptacle seat 48. As will be appreciated, the seat 48 restricts withdrawal of the fastener 42 absent pushing and sliding the head portion 56 back into the circular aperture 44a defined by the receptacle 30.

In the illustrated embodiment shown in FIG. 3, six fasteners 42 are affixed to the web 14, one at each corner and one at the mid section of each longest side. Naturally, more or less than six fasteners 42 may be used without departing from the scope and spirit of the present invention. For example, additional fasteners 42 provided on the short sides of the web 14 could be attached to receptacles provided by the front wall 18 and rear wall 20 of the enclosure.

Although in the illustrated embodiment only one web 14 is used, it is possible to use multiple webs 14 concurrently. In a net form the web 14 may be formed by a number of elastic members which allows the net 14 to close around items being secured within the storage area. In alternate embodiments of the invention the web 14 may be made from a continuous sheet of flexible, transparent material. It is further contemplated that the web may be formed from a disposable or machine washable material. The web 14 is easily removable for cleaning.

Referring to FIGS. 1 and 3, the web 14 is sized to allow for attachment between adjacent rows of receptacles 30 on a single side wall 22 or 24 as well as attachment between rows of receptacles on both side walls 22 and 24 using the same web 14. The web 14 may be configured in a number of different ways depending upon the objects being secured within the storage area. Vertical configurations are efficient for securing tall narrow items such as notebooks or computers. Unlike rigid dividers which may be used in a console, the web 14 does not subdivide the remaining storage area after a first item is secured in place. Thus, the remaining storage area may be used to its maximum efficiency.

Figure 5:
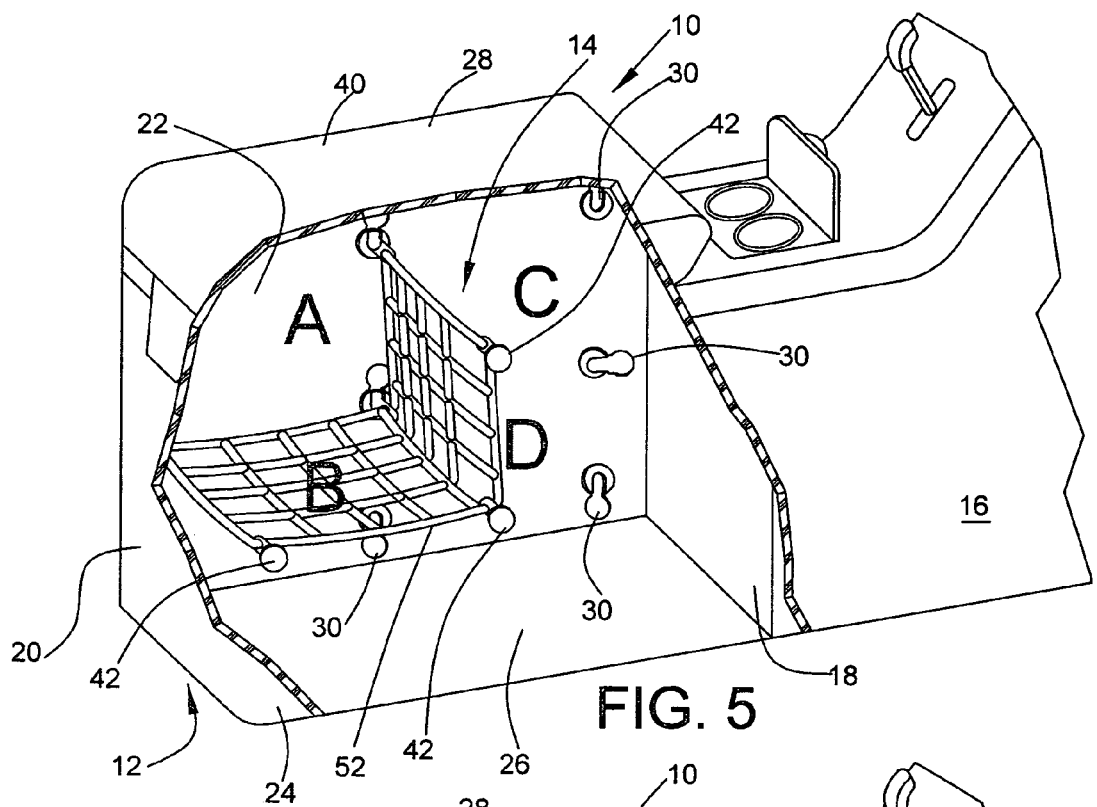
FIG. 5 is a perspective view of the center console assembly of the present invention showing the web in a partially vertical and partially horizontal configuration.

Referring to FIG. 5, different storage zones A, B, C, D (letter in phantom) are shown that may be created by different configurations of the web 14 within the storage area. Zones A (illustrated) or C are created by attachment of fasteners 42 on the web 14 to receptacles 30 in the uppermost and intermediate rows of receptacles 30 on one side wall 22 and the opposite side wall 24. Zones B or D are created similarly, but via attachment to receptacles 30 in the lowermost and intermediate rows. Zones A/B and C/D are created by attachment to centrally located receptacles in all rows on both side walls 22 and 24 and Zones A/C and B/D (FIG. 1) are created by attachment to all receptacles in intermediate rows on both side walls 22 and 24. Note, by creating any of the aforementioned zones, access to the remaining space is not limited. Additional zones may be created, as exemplified in FIG. 3, by affixing fasteners 42 to receptacles 30 on only one of the side walls 22 or 24.

Loading the center console assembly 10 of the present invention may be performed in a number of ways. The web 14 of the center console assembly 10 may be placed in a preferred position prior to placing any items within the storage space defined by the enclosure 12. Alternatively, the web 14 may be put in place after the objects have been inserted into the storage area. Alternatively, some of the fasteners 42 on the web may be within receptacles 30 as objects are inserted into the storage area. Then when loading is complete, the remainder of the fasteners 42 are placed into receptacles 30 to secure the web completely.

The center console assembly 10 of the present invention offers several advantages over the state of the art. First, the center console assembly 10 may be used to secure items for storage in a preferred orientation and in such a way that prevents undue shifting of the items. Allowable variations in item orientation and segregation of the storage area provide for multiple spaces, each being easily accessible. Additionally, because the enclosure 12 defines the storage area as well as the exterior of the center console, the amount of usable storage space within the center console is maximized. Reconfiguration of the storage area is easy, requiring only detachment of some or all of the fasteners 42 on the web 14 and reaffixing them into different receptacles.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A vehicle center console assembly defining a reconfigurable storage area, said console assembly comprising:
    an enclosure defining the storage area, the enclosure further including first and second spaced side walls, a front wall, a rear wall, a base wall and a lid pivotally attached to the rear wall;
    a flexible web segregating the storage area, said flexible web detachably affixed to said enclosure whereby through rearrangement of the flexible web the storage area may be reconfigured; and
    a plurality of receptacles within said enclosure arranged in a pattern of three rows of three receptacles each upon each of said side walls,
    wherein the enclosure is located between two seats inside the vehicle,
    wherein each receptacle defines an aperture and an adjacent slotted seat and wherein the three rows of three receptacles each are configured as follows:
        a lowermost row including three receptacles each having said receptacle aperture as a lowermost portion of said receptacle;
        an uppermost row including three receptacles each having said receptacle aperture as an uppermost portion of said receptacle; and
        an intermediate row including a first receptacle having said receptacle aperture adjacent a first edge of said enclosure side wall, a second receptacle having said receptacle aperture adjacent an opposite edge of said enclosure side wall, and a third receptacle intermediate said first and second receptacles having its aperture as the uppermost portion of said third receptacle.

2. The vehicle center console assembly of claim 1, further comprising a plurality of fasteners affixed to said flexible web.

3. The vehicle center console assembly of claim 2, wherein a number of receptacles within the enclosure exceeds a number of fasteners affixed to said flexible web, thereby allowing multiple configurations of said web within said enclosure.

4. The vehicle center console assembly of claim 2, wherein said fasteners each include a stem portion defining an aperture at a first end for attachment to said web and a head portion at an opposite end of said stem portion for engagement with one of the receptacles.

5. The vehicle center console assembly of claim 4, wherein the stem portion of said fastener may be slid into said slot and the head portion into said seat, whereby interaction between said seat and said head portion restricts removal of said fastener from said receptacle.

6. The vehicle center console assembly of claim 1, wherein said web is a net.

7. The vehicle center console assembly of claim 1, wherein said flexible web has first and second edges along a length of said web and is sized to allow attachment to said enclosure in a first configuration wherein:
said first web edge is detachably affixed to said first side wall of said enclosure and said second web edge is detachably affixed to said second side wall of said enclosure;
as well as a second configuration wherein:
said first web edge is detachably affixed to a first row of receptacles on said first side wall and said second web edge is detachably affixed to an adjacent row of receptacles of said first side wall of said enclosure.

8. The vehicle center console assembly according to claim 2, wherein said plurality of receptacles are integrally provided by said enclosure.

9. The vehicle center console assembly according to claim 2, wherein said plurality of receptacles are provided on a plate that is received in said enclosure.

10. The vehicle center console assembly according to claim 2, wherein a first group of said receptacles are provided by a first plate strip, and a second group of said receptacles are provided by a second plate strip, and wherein said first and second plate strips are affixed within said enclosure.

* * * * *